United States Patent [19]

Nao et al.

[11] Patent Number: 4,607,155

[45] Date of Patent: Aug. 19, 1986

[54] APPARATUS FOR HANDLING BILLS

[75] Inventors: Manabu Nao, Ebina; Shinichi Shimojo, Kokubunji; Kazushi Watari, Yokohama, all of Japan

[73] Assignee: Fujitsu Limited, Kawasaki, Japan

[21] Appl. No.: 625,202

[22] Filed: Jun. 27, 1984

[30] Foreign Application Priority Data

Jun. 27, 1983 [JP] Japan ............................... 58-114181

[51] Int. Cl.[4] ............................................. G06F 15/30

[52] U.S. Cl. .................................................... 235/379

[58] Field of Search .......................................... 235/379

[56] References Cited

U.S. PATENT DOCUMENTS 4,516,015 5/1985 Uchida ............................... 235/379

*Primary Examiner*—Harold I. Pitts

*Attorney, Agent, or Firm*—Staas & Halsey

[57] ABSTRACT

An apparatus for handling bills which includes a plurality of bill boxes each of which contains different denominations of bills, a circuit for withdrawing bills one by one from each bill box and a bill pool for temporarily storing the bills fed from the bill boxes. A circuit for discharging the bills stored in the bill pool through a discharge portion, is provided. A circuit for reading a memory medium introduced into the apparatus by a user, a circuit for inputting a desired amount to be withdrawn, a circuit for rejecting discharge of the bills placed in the bill pool and guiding them to a rejected bill receiving portion within the apparatus and, a circuit for issuing a receipt, are also provided. The bill boxes are disposed vertically one above the other, and a common conveyor route is provided for conveying bills from each bill box to the bill pool. The end portion of the uppermost bill box is used as a rejected bill receiving portion. The receipt issuing circuit is disposed below the lowest bill box and connected to the common conveyor route so that the receipt is transported to the bill pool through the common conveyor route and discharged from the discharge portion together with the bills.

25 Claims, 20 Drawing Figures

| Fig. 12A | Fig. 12B | Fig. 12C |
| --- | --- | --- |

APPARATUS FOR HANDLING BILLS

BACKGROUND OF THE INVENTION (1) Field of the Invention

The present invention relates to an apparatus for dealing with bills, such as an automatic machine for withdrawing money from a bank or a bill counter.

(2) Prior Art

An automatic machine for withdrawing money from the bank is known, in which the user inserts a treated card (memory medium) into the machine, inputs the amount of money to be withdrawn by pushing the buttons of the keyboard of the machine, and then receives the requested amount of money from the machine. Machines of this kind usually comprise: means for reading data magnetically or electrically recorded in the memory medium, such as a card reader; means for displaying the input data input by the user and teaching the user the next procedure for operating the machine; means for inputting the amount of money required and the indentification code of the user, such as a keyboard; a bill dispenser comprising bill boxes housing bills and a bill counter for counting bills withdrawn from the bill boxes; and a means for issuing a receipt on which accounting items such as the data, amount withdrawn, and the amount remaining in the account are printed.

The level of the keyboard and the discharge box in which bills to be withdrawn are placed is limited to a range wherein users can easily operate the machine. The bill dispenser includes the bill boxes and is large and heavy. Therefore, in conventional automatic machines of this kind, only the bill dispenser is disposed below the discharge box or keyboard while the other equipment such as the card reader and the receipt issuing means are disposed above those units. Such a construction makes the machine overlarge and of an unwieldly height. Also, since the receipt is desirably discharged simultaneously with the bills from the discharge box, the receipt must be placed on the bills within the machine. Therefore, the arrangement of the discharge routes of the receipt and the bills is complicated, which also makes the construction of the machine overlarge.

SUMMARY OF THE INVENTION

An object of the present invention is to provide an apparatus for dealing with bills having a compact construction by obviating the above-mentioned problems.

Another object of the present invention is to provide an apparatus for dealing with bills comprising a bill dispenser compactly and operationally combined with a receipt issuing means.

A further object of the present invention is to provide an apparatus for dealing with bills in which the receipt and bills are conveniently made available to the user.

An apparatus for dealing with bills in accordance with the present invention comprises: a plurality of bill boxes containing different denominations of bills; means for withdrawing bills one by one from each bill box; a bill pool for temporarily storing the bills fed from the bill boxes; means for discharging bills stored in the bill pool out of the apparatus through a discharge portion; means for reading a memory medium introduced into the apparatus by a user; means for inputting a desired withdrawal amount; means for rejecting discharge of the bills placed in the bill pool and retaining the rejected bills within the apparatus; and means for issuing a receipt. Features of the apparatus of the present invention include: a plurality of bill boxes disposed vertically, one above the other; a common conveyor route provided for conveying bills from each bill box to the bill pool; the uppermost bill box communicating with the rejecting means and receiving the rejected bills within the end portion thereof; the receipt issuing means being disposed below the lowest bill box and connected to the common conveyor route so that the receipt is transported to the bill pool through the common conveyor route and discharged from the discharge portion together with the bills.

BRIEF DESCRIPTION OF THE DRAWINGS

The present invention is described in detail hereinafter with reference to the accompanying drawings in which.

DESCRIPTION OF THE PREFERRED EMBODIMENTS

Figure 1:
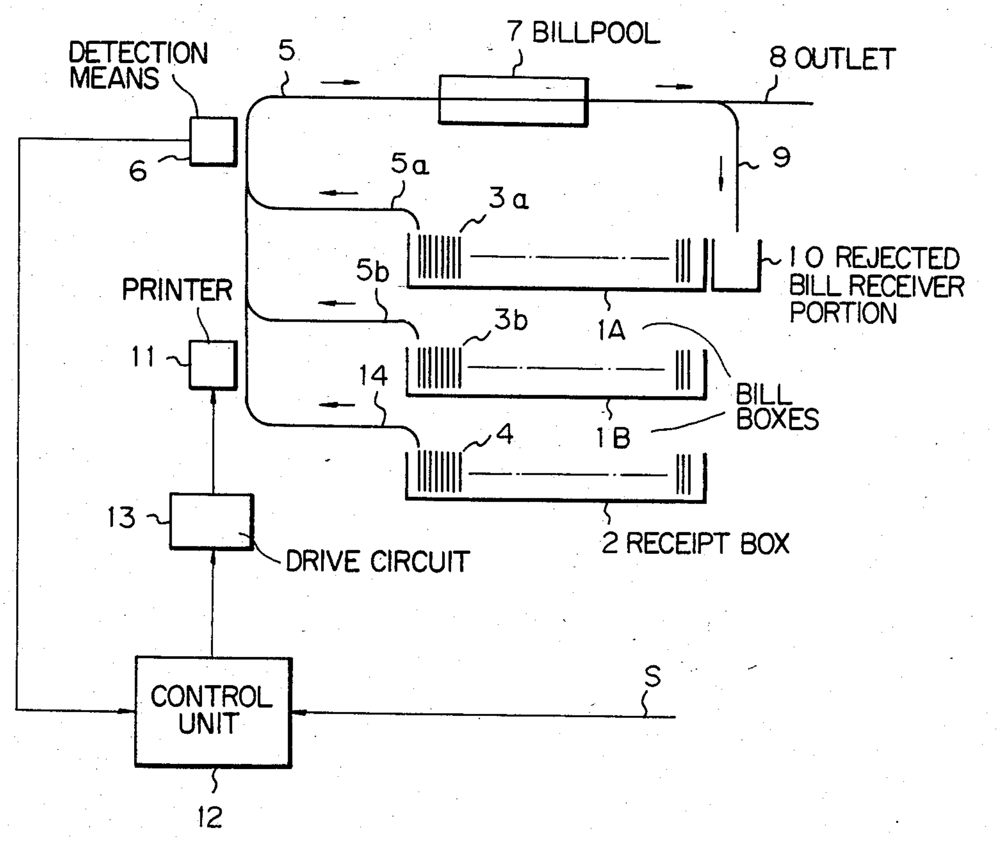
FIG. 1 is a system distribution diagram of the apparatus of the present invention.

The preferred embodiments of the present invention are described hereinafter with reference to the drawings. An explanation of the essential principle of the present invention is illustrated in FIG. 1. Bill boxes 1A and 1B, which contain different denominations of bills 3*a* and 3*b*, respectively, are stacked vertically one above the other. A withdrawal means (not shown) withdraws a single bill from each of the bill boxes 1A and 1B. The withdrawn bill from each bill box 1A or 1B is conveyed along a feeding route 5*a* or 5*b* to a common conveyor route 5, as shown by arrows, by conveyor belts (not shown). A detection means 6 for checking whether or not the correct bill has been withdrawn and is disposed on the common conveyor route 5. The checked bill is transported to a bill pool 7 where the bill is temporarily stored. If the detection means 6 detects that an incorrect bill has been transported or that two single bills are superimposed and transported simultaneously, the bill or bills are guided to a rejected bill receiver portion 10 located at the rear end of the upper bill box 1A, together with bills which were stored in the bill pool 7, through a reject route 9.

A receipt box 2 which contains receipts 4 having a size similar to the bills is disposed below the lower bill box 1B. A single receipt 4 is withdrawn from the receipt box 2 by a withdrawing means (not shown) and conveyed through a receipt route 14 to the common conveyor route 5. A printer unit 11 for printing the receipt 4 is disposed along the receipt route 14. A signal S, signifying the amount withdrawn and the identification number of the magnetic card of the user is input to a control circuit 12 by a keyboard (not shown). The result of the detection by the detection means 6, including the total obtained by counting the bills, is input to the control circuit 12, where the input signal S and the total obtained by counting are checked. If the total obtained by counting agrees with the input signal S, the control circuit 12 actuates a drive circuit 13 so that the amcunt withdrawn, the amount remaining in the account, the data, the card number, etc., are printed on the receipt by the printer unit 11. The printed receipt 4 is conveyed to the bill pool 7 through the common conveyor route 5, temporarily stored there with the bills, and discharged through the outlet 8 together with the bills.

Figure 2:
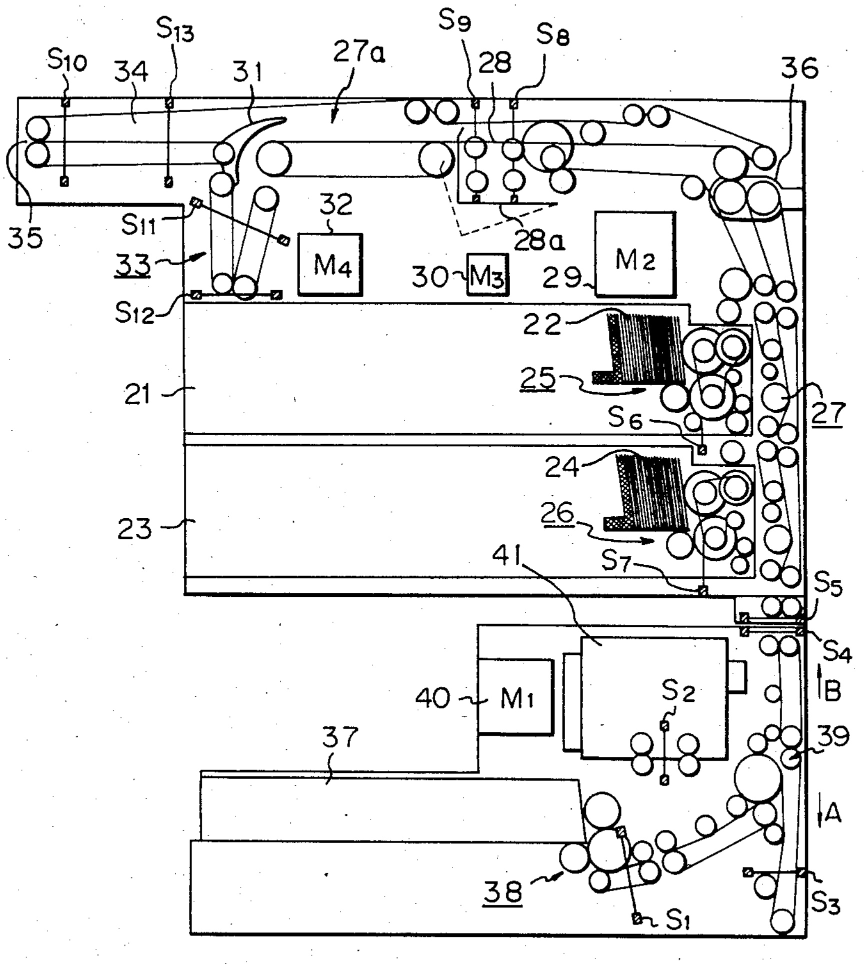
FIG. 2 is a constructional view of the main portion of the apparatus of the present invention.

FIG. 2 is a constructional view of an embodiment of the present invention. Bills 22 of one denomination are contained within a first upper bill box 21. Bills 24 of another denomination are contained within a second lower bill box 23. A bill withdrawing means 25, comprising rollers, withdraws the bills 22 one by one from the upper bill box 21. The bills 22 are conveyed to a bill pool 28 by conveyor means 27 comprising rollers and belts. Bills 24 in the lower bill box 23 are withdrawn from the bill box 23 by a withdrawing means 26 and are also conveyed to the bill pool 28. The withdrawing means 25 and 26 and the conveyor means 27 are driven by a motor $M_2$ (29) through clutch means (not shown). A stopper 28*a* is disposed on the conveyor route 27*a* above the bill pool 28. The stopper 28*a* can be taken out of the conveyor route 27*a*, as illustrated by a dashed line, by a motor $M_3$ (30), to allow unhindered passage of the bills from the bill pool 28 to a discharge portion 35, along the conveyor route 27*a*.

A double feed detector 36 is disposed on the conveyor route defined by the conveyor means 27 so as to detect the simultaneous conveyance of two superimposed bills.

A transfer gate 31 is disposed on the conveyor route 27*a* to guide the bills into the rear end portion of the upper bill box 21, through a reject route 33, when an error is detected during the conveyance of the bills.

The conveyor means along the route 27*a* from the bill pool 28 to the discharge portion 35 and the reject route 33 are driven by a motor $M_4$ (32), through clutch means (not shown). The bills to be delivered to the user are stopped at a waiting portion 34 for a final confirmation of the amount to be withdrawn by the user, before being discharged from the apparatus through the discharge portion 35.

A receipt box 37 is disposed below the lower bill box 23. The receipt box 37 contains receipts (not shown) having a shape and size similar to the bills 22 and 24. Receipts are taken out of the receipt box 37 one by one by a withdrawing means 38 and conveyed to the lower portions of a printer 41, which prints the prescribed items on the upper surface of the receipt. The printed receipt is then conveyed, first backward as shown by an arrow A, then forward to the aforementioned conveyor means 27 as shown by an arrow B, so that the printed surface of the receipt is disposed at the upperside when the receipt arrives at the bill pool 28 and is placed on top of the bills stacked therein. The receipt is then conveyed sumultaneously with the bills from bill pool 28 to the discharge portion 35.

Sensors $S_1$ to $S_{13}$ are disposed on the conveyor route for the receipt and the bills. The function of each sensor is as follows. Sensor $S_1$ detects the feed motion of the receipt and controls the function of the clutch associated with the withdrawing means 38. Sensor $S_2$ detects the arrival of the receipt at the printing position below the printer 41. Sensor $S_3$ detects the arrival of the printed receipt at the turning point of the switchback route. Sensor $S_4$ is disposed on the printer side and detects the transfer of the receipt from the printer unit to the bill dispenser unit. Sensor $S_5$ is disposed on the bill dispenser side and detects the transfer of the receipt.

Sensor $S_6$ detects the feed motion of the bills from the upper bill box 21 by the withdrawing means 25. Sensor $S_7$ detects the feed motion of the bills from the lower bill box 23 by the withdrawing means 26. Sensors $S_8$ and $S_9$ detect bills in the bill pool 28. Sensor $S_{10}$ detects the withdrawal of the receipt and the bills from the machine. Sensor $S_{11}$ detects the passage of the bills through the reject route 33. Sensor $S_{12}$ detects the entrance of the bills into the rejected bill receiver portion (not shown) of the upper bill box 21. Sensor $S_{13}$ detects bills at the waiting portion 34. Thus transportation of the receipt and the bills by the conveyor means proceeds subsequent to the detection of the normal status of the receipt and the bills by each of the sensors 1 to 13.

Figure 3:
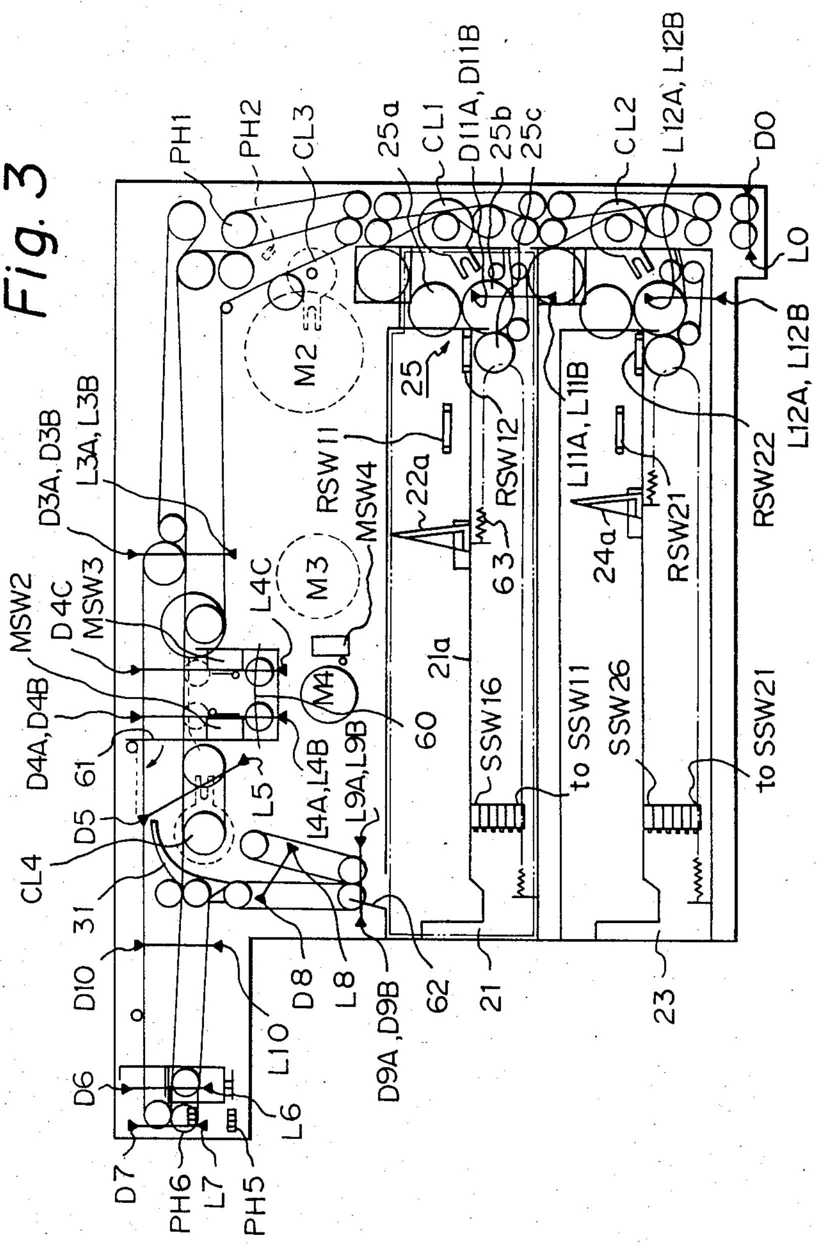
FIG. 3 is a constructional view of the bill dispenser device of the present invention.
Figure 4:
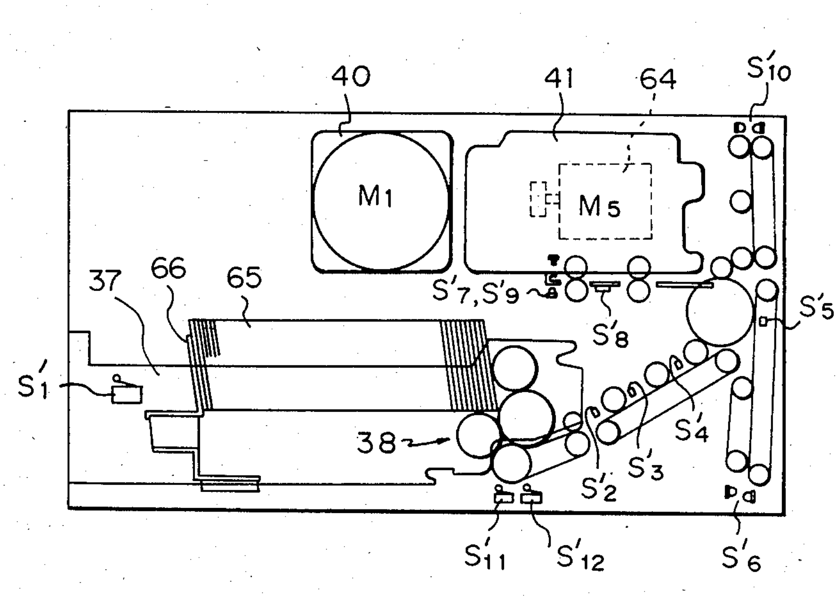
FIG. 4 is a constructional view of the receipt printer unit of the present invention.
Figure 5:
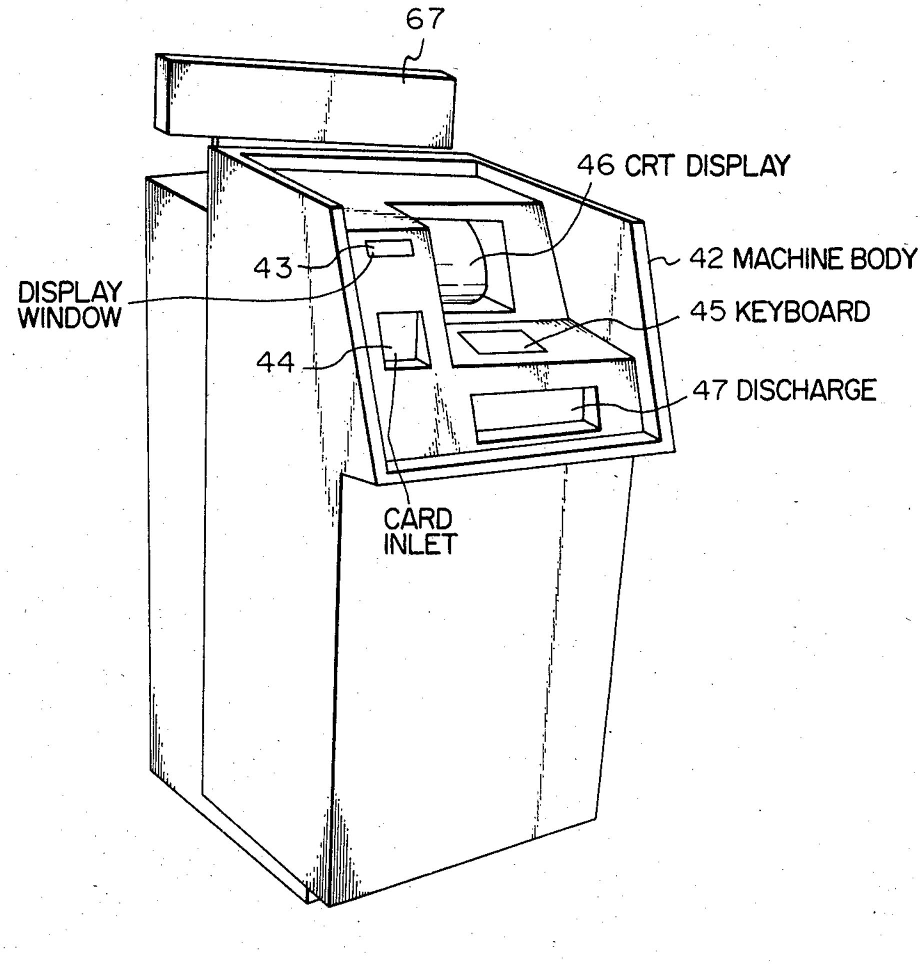
FIG. 5 is an outer view of the automatic machine for withdrawing bills from the bank in accordance with the present invention.
Figure 6:
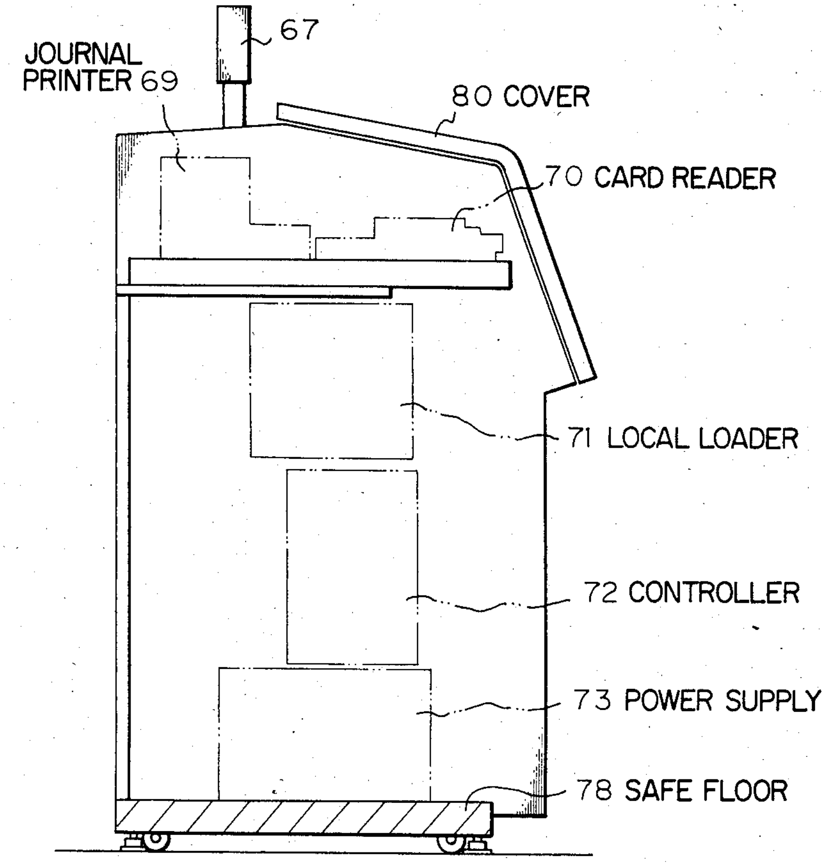
FIG. 6 is a left side view of the automatic machine of FIG. 5.
Figure 7:
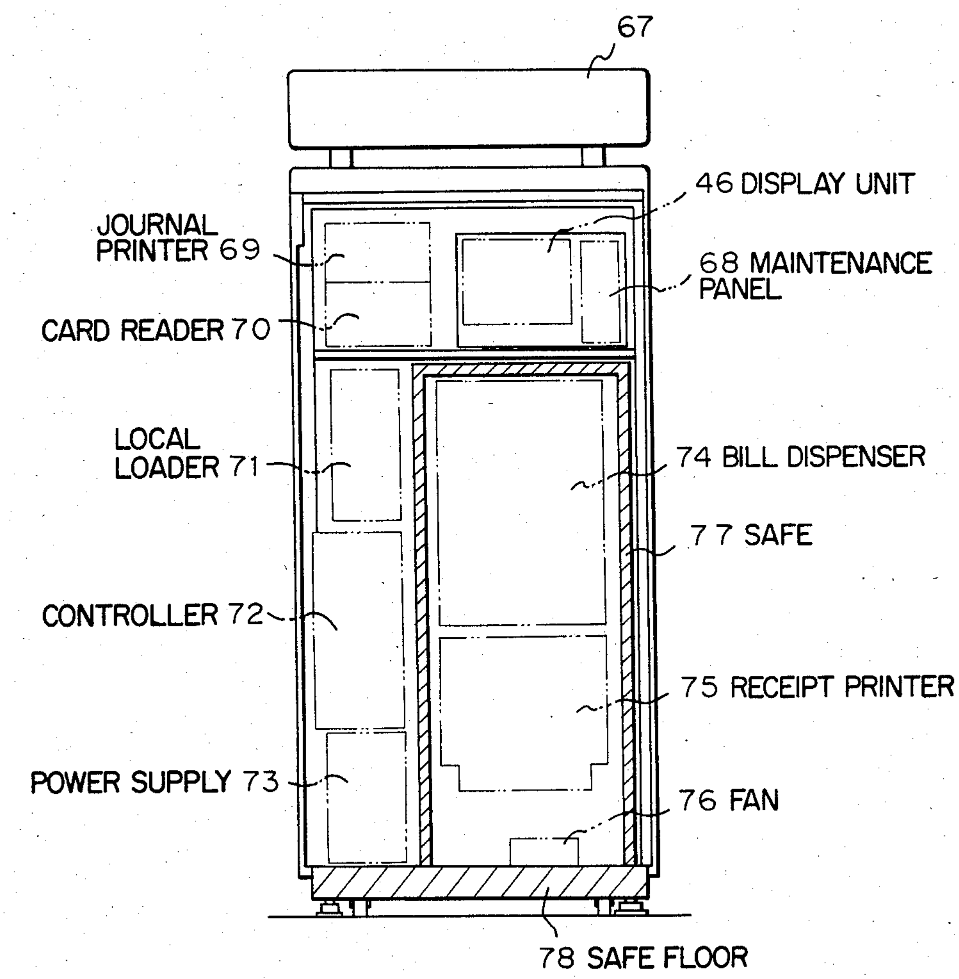
FIG. 7 is a front view of the automatic machine of FIG. 5.
Figure 8:
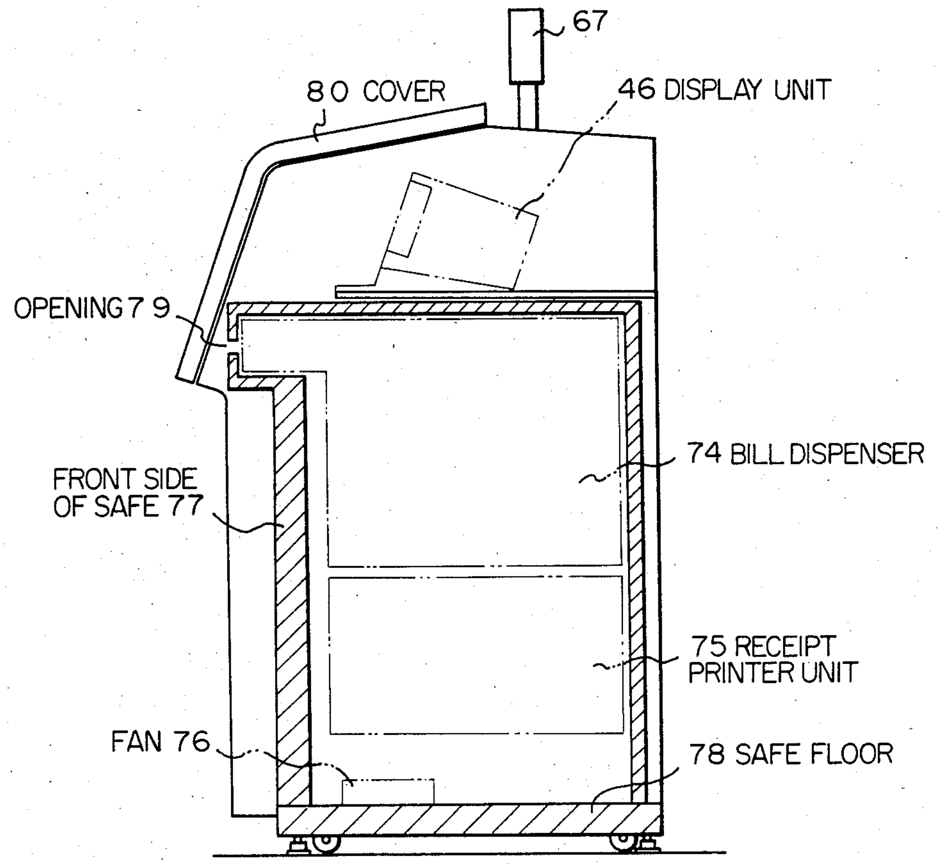
FIG. 8 is a right side view of the automatic machine of FIG. 5.
Figure 9:
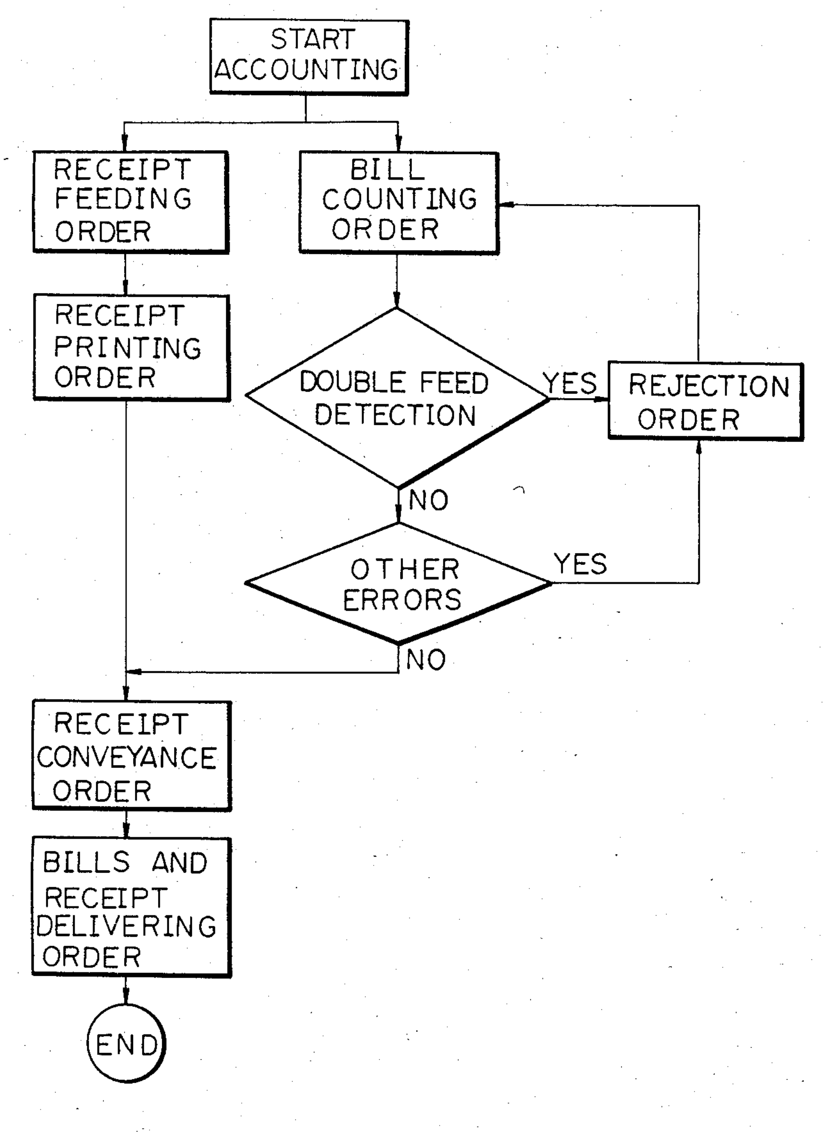
FIG. 9 is a flow chart of the operation of the apparatus of the present invention.
Figure 10:
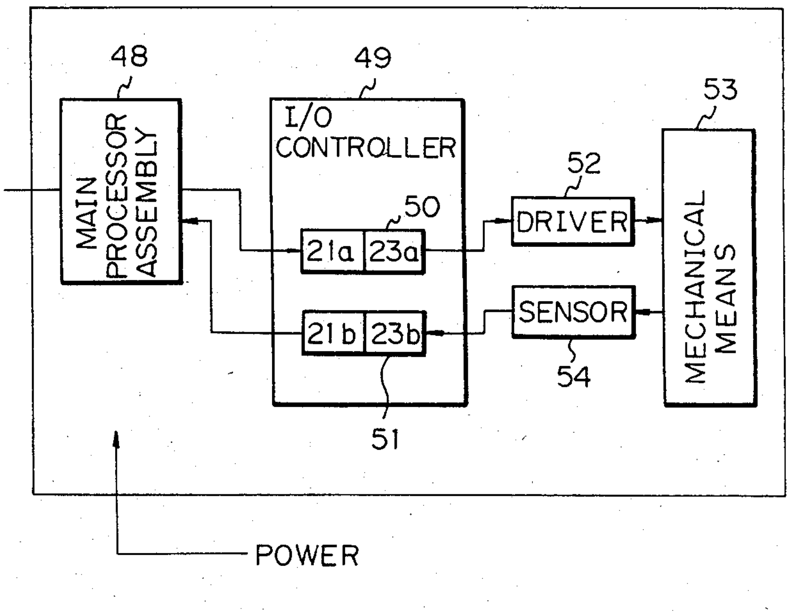
FIG. 10 is a block diagram of the apparatus of the present invention.
Figure 11:
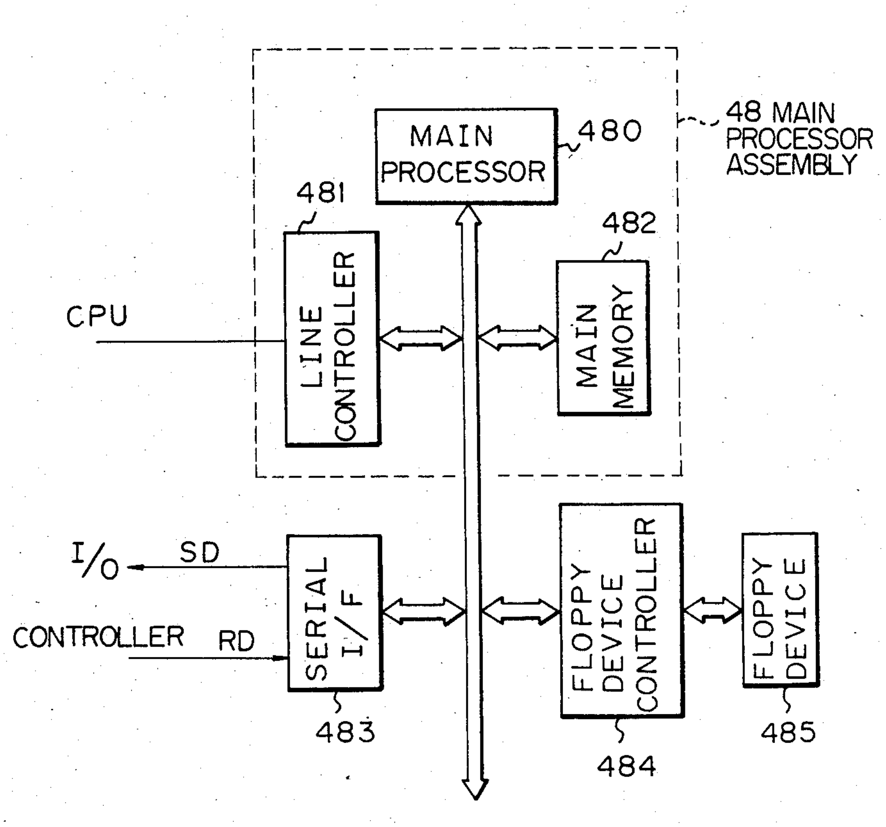
FIG. 11 is another block diagram of the apparatus of the present invention.
Figures 12, 12A:
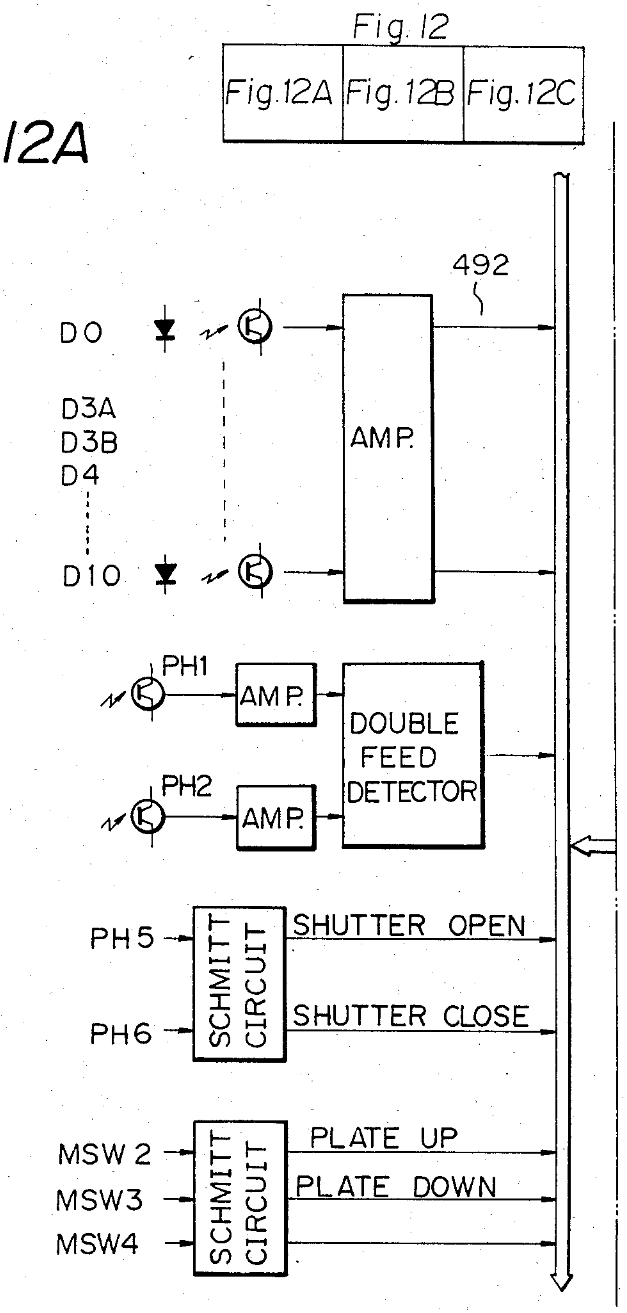
FIGS. 12A, 12B, and 12C are block diagrams of the bill dispenser device of FIG. 3.
Figure 12B:
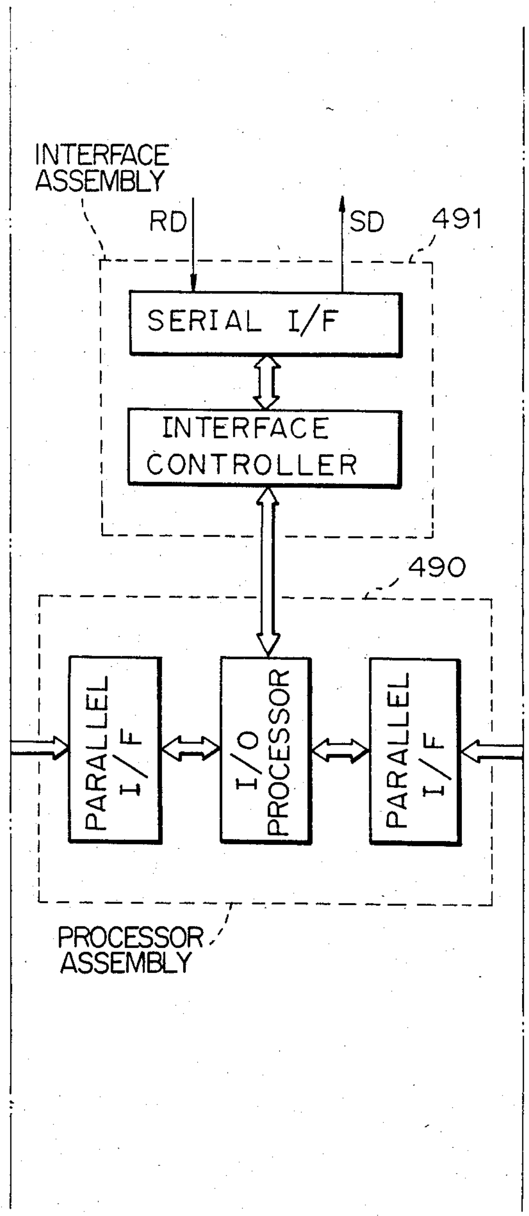
Figure 12C:
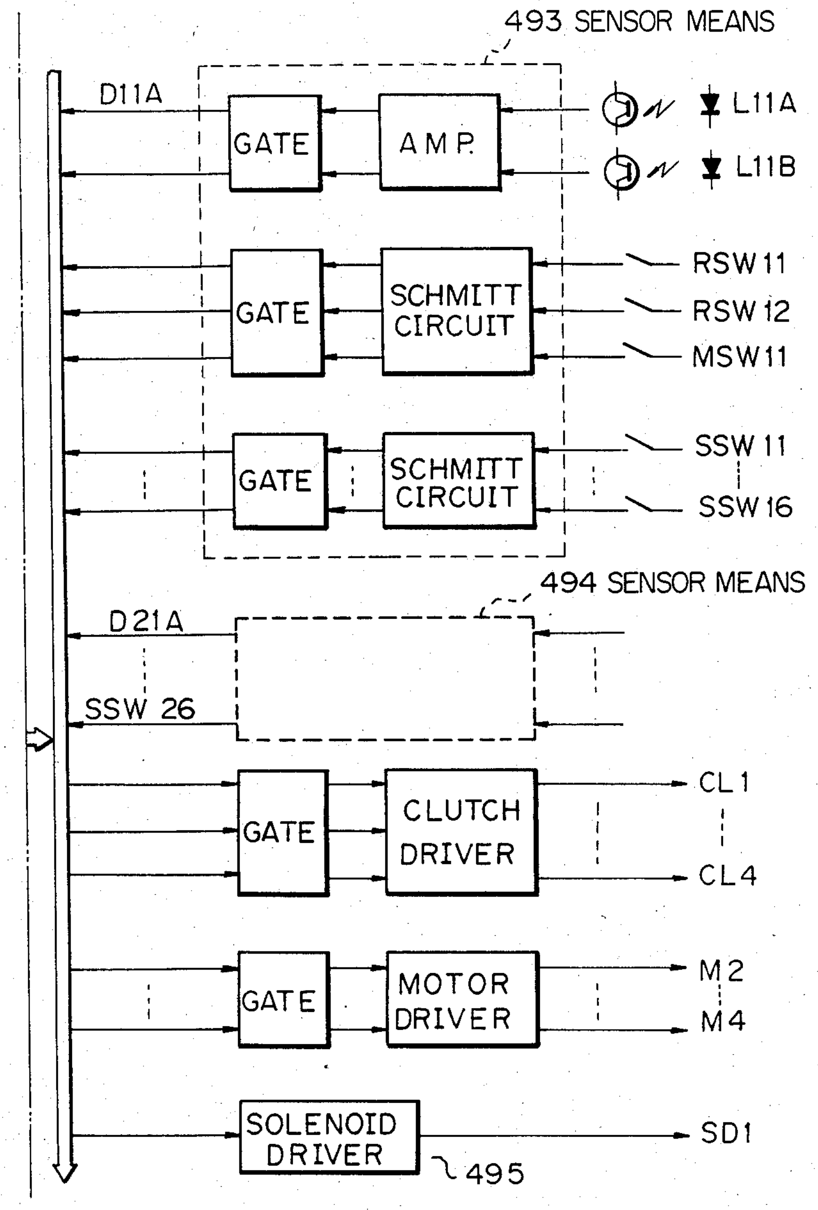
Figure 13:
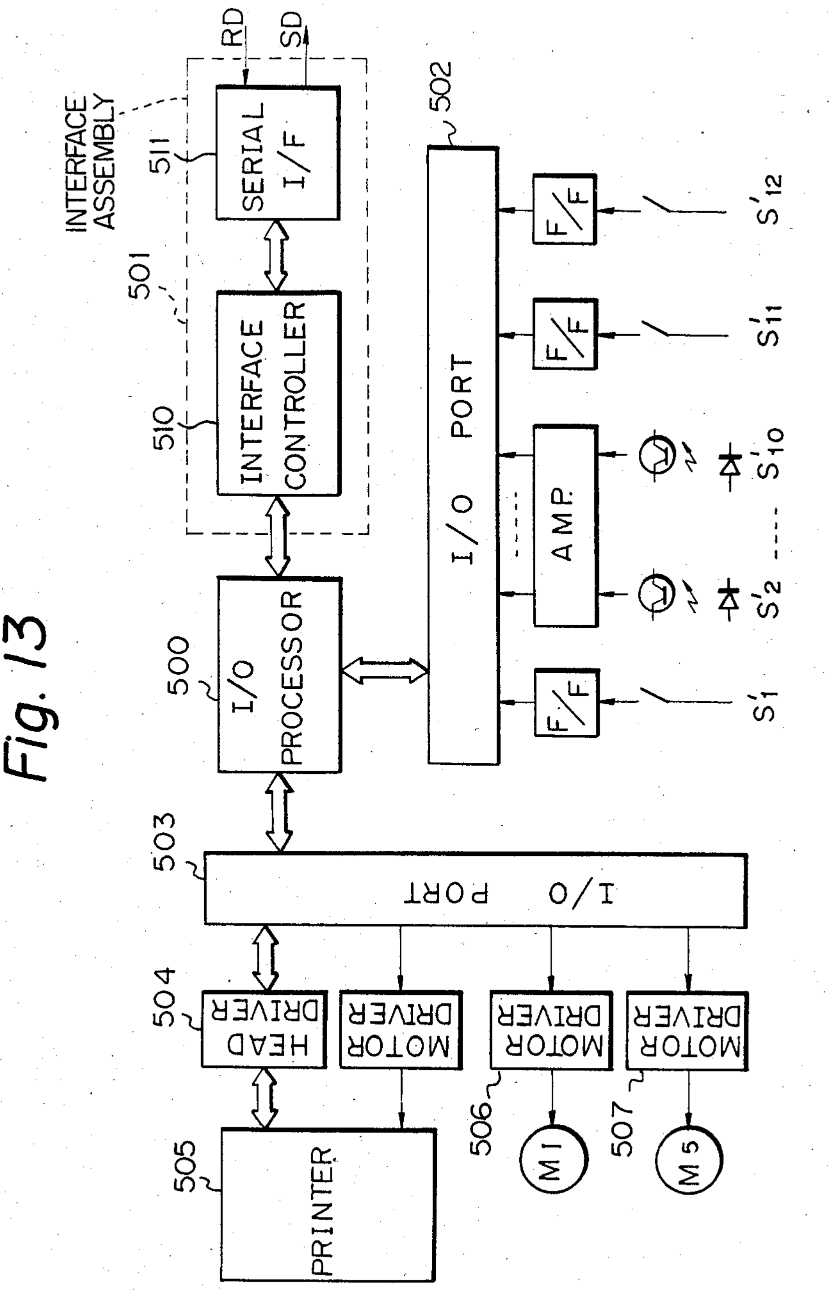
FIG. 13 is a block diagram of the receipt printer unit of FIG. 4.
Figure 14:
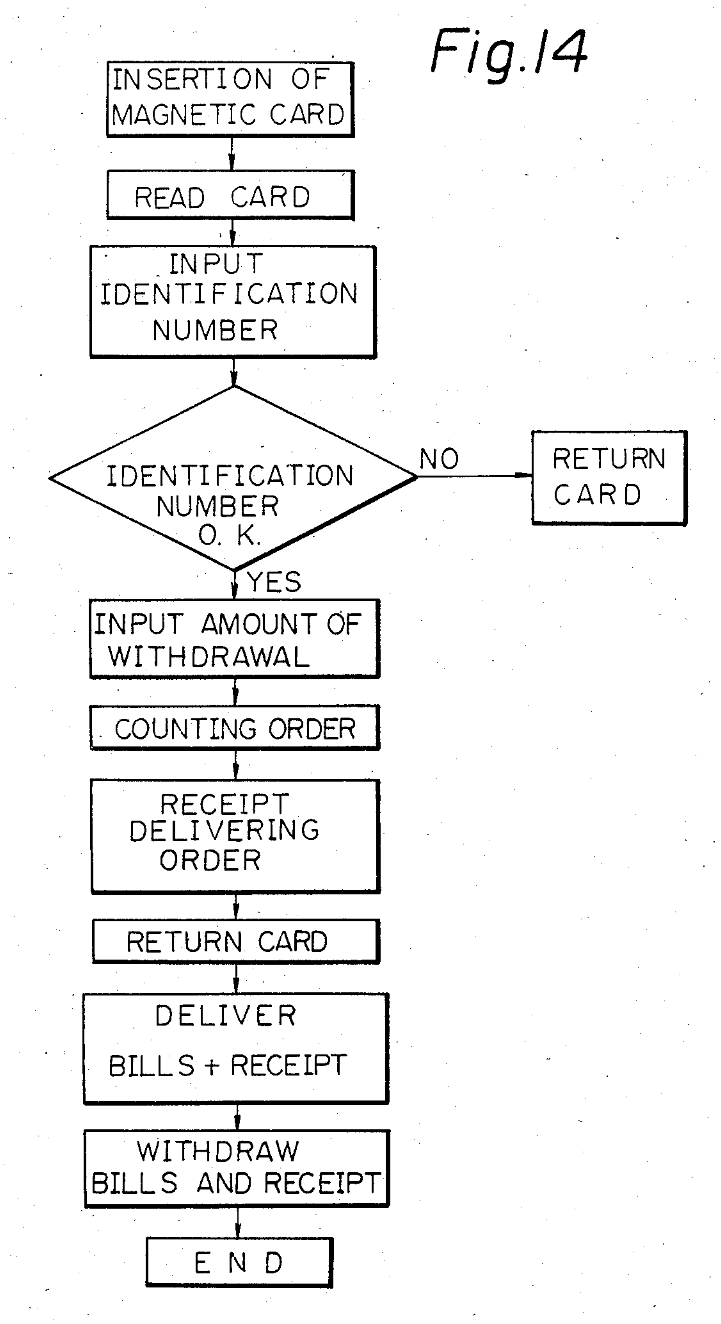
FIG. 14 is a flow chart of the operation of the apparatus of the present invention.
Figure 15A:
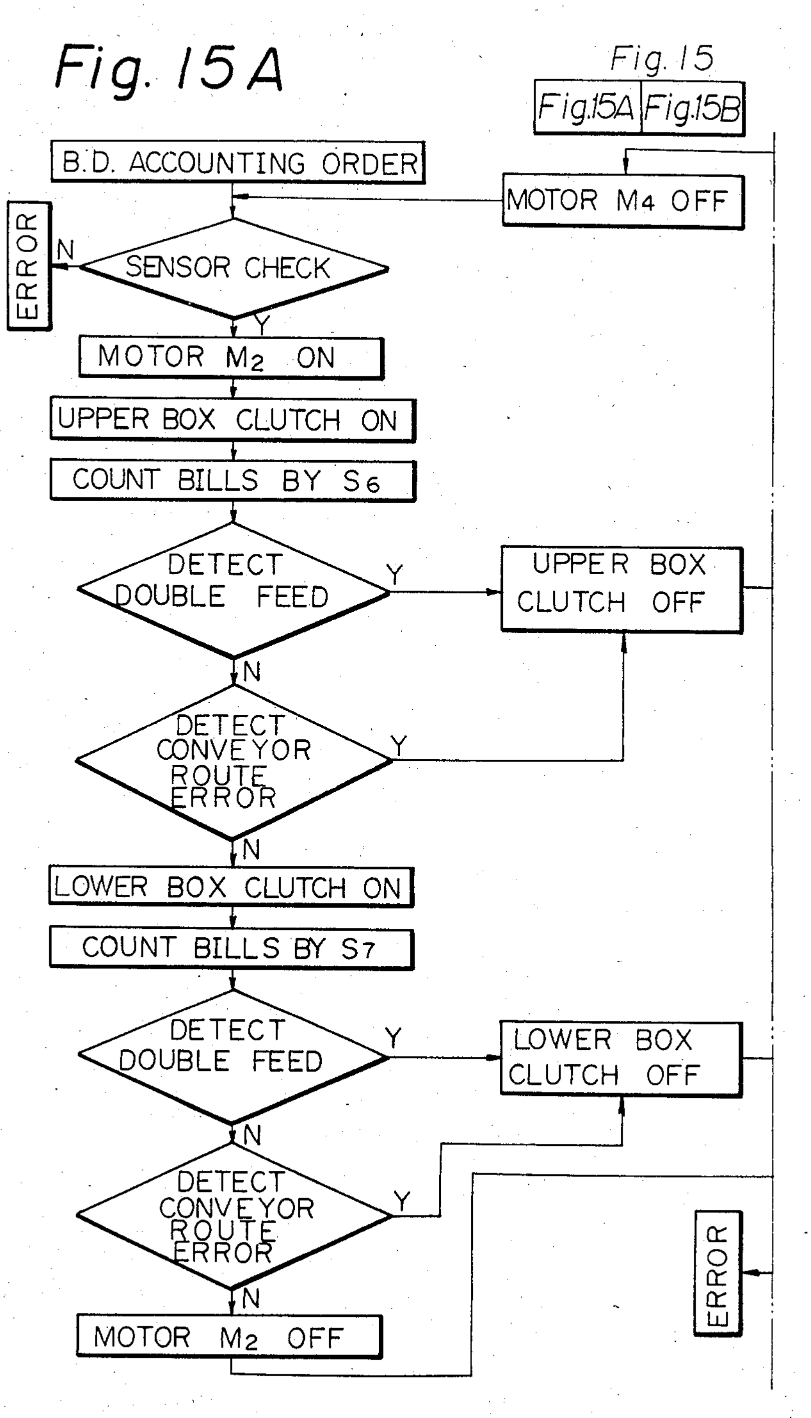
FIGS. 15A, 15B, and 16 are flow charts of the operation of the bill dispenser device of the present invention.
Figure 15B:
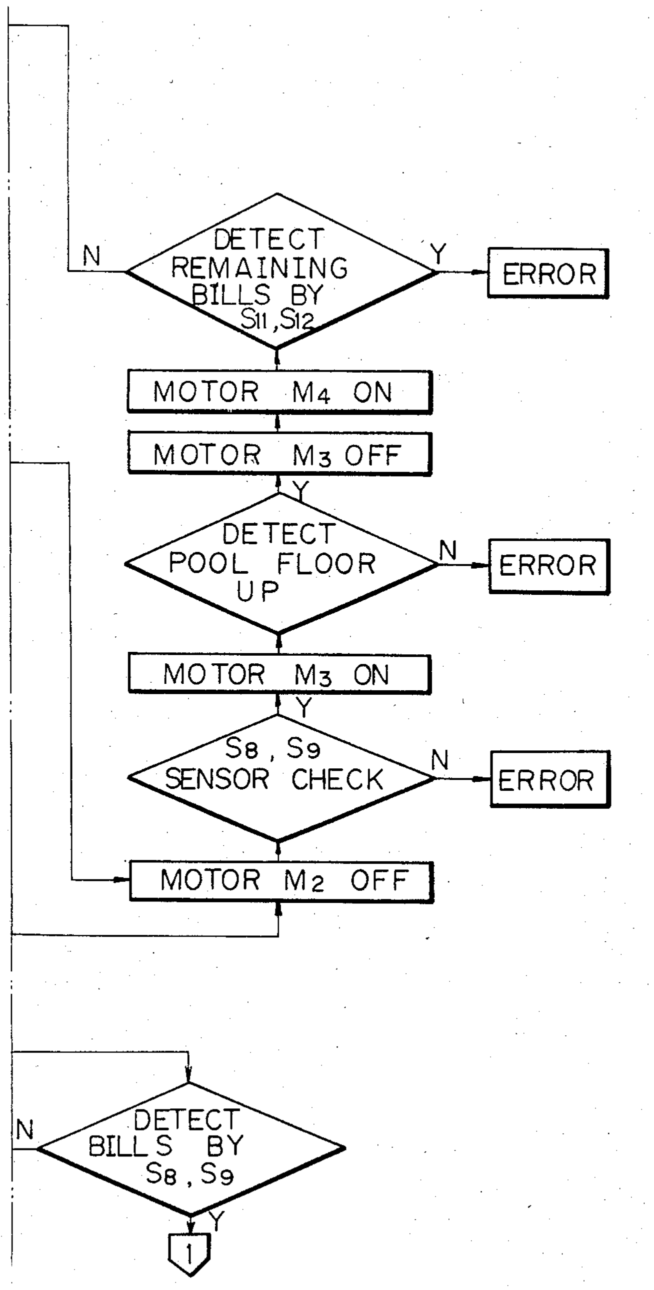
Figure 16:
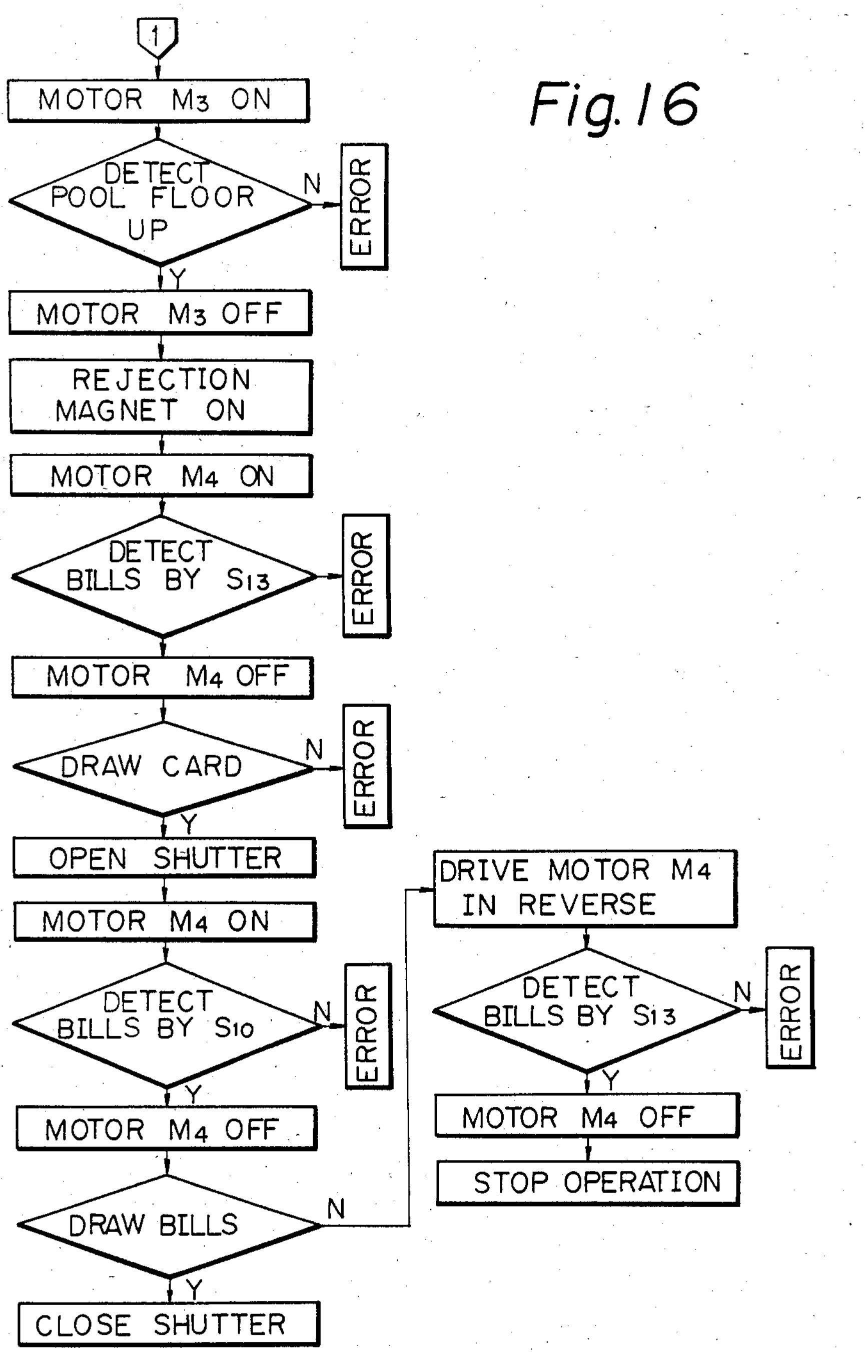

The bill dispensor unit of the present invention is further described with reference to FIG. 3. The bill box 21 (enclosed by a dash-two-dot line in the Figure) can be withdrawn from the unit together with the withdrawing means 25. The withdrawing means 25 comprise a kick roller 25*a*, a feed roller 25*b*, and a separate roller 25*c*. The kick roller 25*a* comprises a kicking projection (not shown) which comes in contact with a bill (not shown) located at the righthand end and feeds the bill downward by the rotation of the roller. The feed roller 25*b* comprises a rubber portion (not shown) on the outer surface thereof for frictional contact with the bill and is synchronized with the kick roller 25*a* so that the rubber portion of the feed roller 25*b* faces the bill fed by the kick roller 25*a*. The outer surface of the separate roller 25*c* is made of a high-friction material to avoid a double feed of the bills. The withdrawing means 25 is connected to the motor $M_2$ through a clutch CL1. When the bill box 21 is withdrawn from the unit, the withdrawing means 25 is disengaged from the drive means and locked to prevent rotation of the withdrawing means 25 and thereby avoid accidental withdrawal of the bills contained in the bill box 21.

The bills are urged forward (toward the right) by a pusher 22*a* connected to a spring 63 disposed under the intermediate floor 21*a* of the bill box 21. A near switch RSW 11 detects when the pusher 22*a* is close to the end position and the remaining bills are less than a predetermined amount. Another near end switch RSW 12 de-

UNITED STATES PATENT AND TRADEMARK OFFICE
CERTIFICATE OF CORRECTION

PATENT NO. : 4,607,155

DATED : AUGUST 19, 1986

INVENTOR(S) : MANABU NAO ET AL.

It is certified that error appears in the above-identified patent and that said Letters Patent is hereby corrected as shown below:

Col. 2, line 7, after "thereof;" insert --and--.

Col. 5, line 67, change "unit," to --unit)--.

Col. 6, line 10, "5'9" should be --S'9--.

Col. 11, line 18, after "user" insert --;--.

Col. 12, line 58, after "detection" insert --of--.

Signed and Sealed this

Fourth Day of November, 1986

[SEAL]

*Attest:*

DONALD J. QUIGG

*Attesting Officer*

*Commissioner of Patents and Trademarks* driven in the reverse direction and the bills and the receipt are returned to the waiting portion 34. The apparatus then displays a notice informing the user that the money is waiting and has not been withdrawn.

Figure 17:
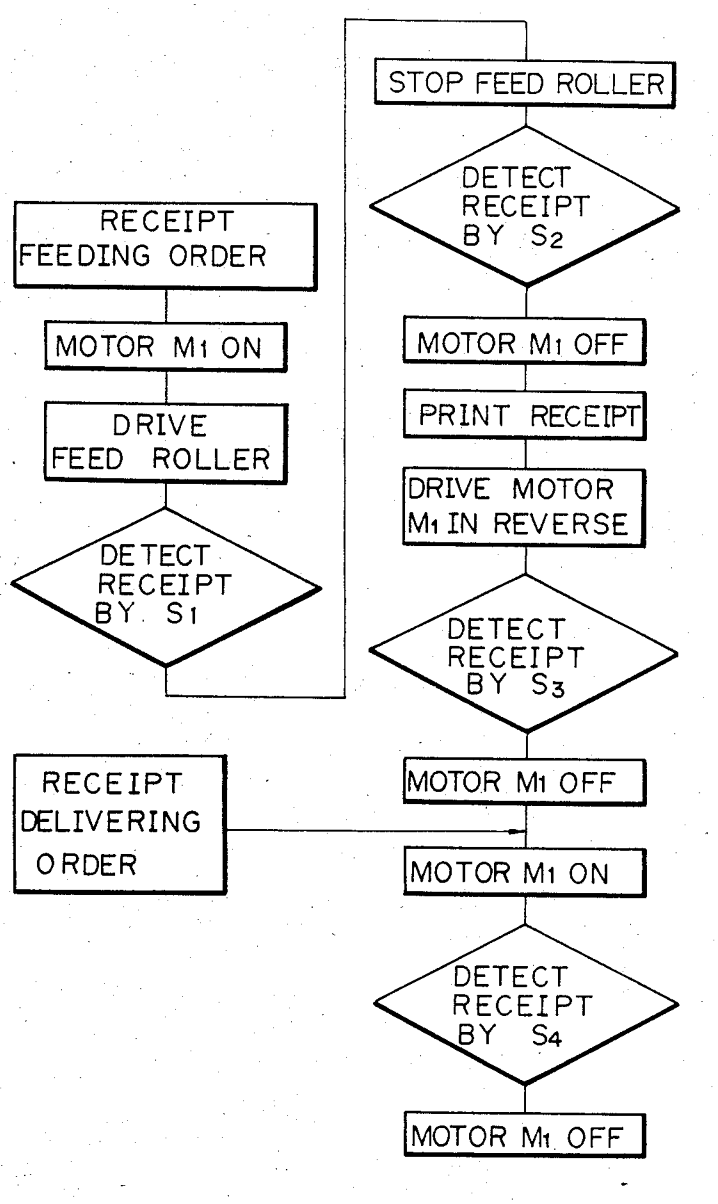
FIG. 17 is a flow chart of the operation of the receipt printer unit of the present invention.

The function of the receipt printer unit is illustrated in the flow chart of FIG. 17. When the accounting operation starts, the CPU orders the unit to drive the motor $M_1$ to feed a receipt. The clutch is operated to drive the receipt withdrawing means 38, enabling a single receipt to be withdrawn from the receipt box. When the sensor $S_1$ (FIG. 2) detects that the receipt is withdrawn from the receipt box, the clutch is de-energized and the withdrawing means stops functioning. The receipt is conveyed to the printing position under the printer 41 by the motor $M_1$. The sensor $S_2$ detects when the receipt is at the printing position. Then, the motor $M_1$ is stopped and the predetermined items are printed on the receipt. After the receipt is printed, the motor $M_1$ is driven in the reverse direction so that the receipt is conveyed back along the switch back route, as shown by an arrow A, to arrange the receipt in the bill pool so that the printed surface is oriented upward. When the sensor $S_3$ detects the receipt at the turning point of the switch back route, the motor $M_1$ is stopped to stop the receipt. The receipt remains at that point until the predetermined amount of bills are conveyed to the bill pool. After that, the CPU orders the printer unit to deliver the receipt. In accordance with the receipt delivering order, the motor $M_1$ is driven again to convey the receipt in the direction of an arrow B toward the outlet of the printer unit, where the sensor $S_4$ is disposed. Upon detection of the receipt by the sensor $S_4$, the motor $M_1$ is stopped. The receipt is transferred to the conveyor route of the bill dispensor unit and conveyed to the bill pool by the conveyor means 27. The receipt is then placed on the top of the bills stacked on the floor plate of the bill pool and conveyed together with the bills to the discharge portion 35, through which the user withdraws the bills and the receipt from the apparatus.

As mentioned above, in the apparatus of the present invention, each receipt has a shape and a size similar to those of the bills, so that the bill conveyor route can be commonly used as a conveyor route for conveying the receipt, which makes it possible to realize a small automatic machine for dealing with bills. Also, features wherein the rear portion of the bill box of the bill dispenser unit is used as a reject box for receiving rejected bills and the receipt printer unit is disposed below the bill dispenser unit make the apparatus small and compact. Further, the user will always be supplied with a receipt since the receipt is delivered to the user together with the bills.

We claim:

1. An apparatus for dealing with bills comprising:

a plurality of bill boxes, each of which contains a different denomination of bills, disposed vertically one above the other;

means for withdrawing bills one by one from each of said bill boxes;

a bill pool, operatively connected to said plurality of bill boxes, for temporarily storing the bills fed from said bill boxes;

means for discharging the bills stored in said bill pool through a discharge portion;

means for reading a memory medium introduced into the apparatus by a user;

means for inputting a desired amount to be withdrawn;

means for preventing discharge of the bills in the bill pool to be discharged and for guiding the bills to a rejected bill receiving portion within the apparatus;

means for issuing a receipt, disposed vertically below a lowermost bill box; and a common conveyor route provided in the path of said plurality of bill boxes, for conveying bills from each of said plurality of bill boxes to said bill pool, an end portion of an uppermost bill box used as a rejected bill receiving portion, said receipt issuing means connected to said common conveyor route so that the receipt is transported to said bill pool through said common conveyor route and discharged from said discharge portion together with the bills.

2. An apparatus as set forth in claim 1, further comprising a double feed detector disposed in the path of said common conveyor route for outputting a signal upon detection of a double feed operation, wherein said rejecting means is actuated in response to the output signal from said double feed detector.

3. An apparatus as set forth in claim 1, further comprising a safe, wherein said receipt issuing means comprises a receipt printer unit, and wherein said receipt issuing means and said bill boxes are enclosed within said safe.

4. An apparatus as set forth in claim 1, wherein said withdrawing means comprises:

a feed roller assembly installed within each of said bill boxes; and a passage for transporting the bills from each of said bill boxes to said common conveyor route.

5. An apparatus as set forth in claim 1, wherein the bills lie vertically side by side within said bill boxes, further comprising pushing means for pushing the bills toward said withdrawing means.

6. An apparatus as set forth in claim 1, wherein each bill box comprises a pusher for urging bills toward said withdrawing means, wherein a space behind said pusher of the uppermost bill box is used as said rejected bill receiving portion.

7. An apparatus as set forth in claim 1, further comprising:

double feed detector means, disposed in the path of said conveyor route, for detecting when two bills are conveyed simultaneously; and control means, operatively connected to said double feed detector and said withdrawing means, for controlling said rejecting means to convey the bills stored in said bill pool to said rejected bill receiving portion upon detection of a double feed by said double feed detection means, and for controlling said withdrawing means to again withdraw bills from said plurality of bill boxes.

8. An apparatus as set forth in claim 1, further comprising:

means, operatively connected to said bill pool, for detecting the state when the predetermined amount of bills are correctly conveyed from each of said plurality of bill boxes to said bill pool; and means for transporting the receipt issued by said receipt issuing means to said common conveyor route, upon detection of a double feed by said detecting means, so as to place the receipt on top of the bills in said bill pool.

9. An apparatus as set forth in claim 2, wherein said rejecting means comprises a transfer gate located at a diverging point in the path of said conveyor route where said rejected bill receiving portion joins said conveyor route.

10. An apparatus as set forth in claim 3, wherein said receipt printer unit comprises:

a printer for printing accounting data on the receipt;
container means for containing the receipt; and
means for conveying the printed receipt to said common conveyor route.

11. An apparatus as set forth in claim 1, wherein each of said bill boxes can be withdrawn from the apparatus.

12. An apparatus for dealing with bills comprising:

a bill box portion containing bills;
a bill conveyor route for conveying bills withdrawn from said bill box portion;
receipt issuing means, disposed below said bill box portion, for delivering the receipt and the bills simultaneously to a user
a rejected bill receiving portion, formed within said bill box portion, for receiving rejected bills; and
a receipt conveyor route located in the path of said bill conveyor route, for transporting the receipt issued by said receipt issuing means to said bill conveyor route.

13. An apparatus as set forth in claim 12, wherein said bill box portion has a bill withdrawing portion, wherein said bill container portion comprises a pusher for urging bills toward the bill withdrawing portion of said bill box, and wherein said rejected bill receiving portion is formed behind said pusher with respect to the pushing direction.

14. An apparatus as set forth in claim 13, wherein said bill box portion comprises a plurality of bill boxes containing different denominations of bills, and wherein said rejected bill receiving portion is located in one of said bill boxes.

15. An apparatus as set forth in claim 12, having a bill discharge portion and further comprising:

a bill pool, located in the path of said bill conveyor route, for temporarily storing bills conveyed from said bill box portion; and
discharging means for delivering the bills in said bill pool along with the receipt issued by said receipt issuing means to the user through the bill discharge portion.

16. An apparatus as set forth in claim 15, wherein said bill box portion comprises a plurality of bill boxes each of which includes means, disposed on a back portion of said bill boxes with respect to the apparatus, for withdrawing bills from said bill boxes, wherein the bill discharge portion is disposed in the front of the apparatus, wherein said bill conveyor route includes a first common vertical route to which each of said bill boxes is connected and a second substantially horizontal common route which is a continuation of said first common route and extends to the bill discharge portion, and wherein said bill pool is disposed in the path of said second substantially horizontal common route.

17. An apparatus for dealing with bills which counts bills in accordance with the demand of the user and delivers the bills with a receipt to the user from a bill discharge portion, said apparatus comprising:

a plurality of bill boxes containing bills;
means for withdrawing bills from each of said bill boxes;
a common conveyor route, operatively connected to said bill boxes, for conveying bills withdrawn from each of said bill boxes;
means for issuing a receipt; and
a receipt conveyor route, intersecting said common conveyor route, for transporting said receipt to said common conveyor route.

18. An apparatus as set forth in claim 17, wherein said common conveyor route has a lower end, wherein said receipt issuing means is disposed below said bill boxes, wherein said receipt conveyor route is connected to the lower end of said common conveyor route.

19. An apparatus as set forth in claim 17, wherein a bill pool for temporarily storing bills fed from each of said bill boxes is disposed in the path of said common conveyor route, and wherein the receipt issued by said receipt issuing means is placed on top of the bills in said bill pool.

20. An apparatus as set forth in claim 19, further comprising means, located in the path of said common conveyor route, for rejecting the delivery of the bills stored in said bill pool.

21. An apparatus as set forth in claim 17, wherein said receipt issuing means comprises a receipt box containing receipts, said apparatus further comprising:

a printer for printing accounting data on the receipt withdrawn from said receipt box; and
a switch back route disposed in the path of said receipt conveyor route.

22. An apparatus for dealing with bills comprising:

bill boxes containing bills;
a bill conveyor route for conveying bills withdrawn from said bill boxes;
a bill pool, located in the path of said bill conveyor route, for temporarily storing bills disposed on said bill conveyor route;
a receipt container containing receipts having a size similar to that of said bills;
a printer for printing the receipt withdrawn from said receipt container; and
means for transporting the printed receipt to said bill conveyor route.

23. An apparatus as set forth in claim 22, wherein said bill conveyor route is common to each of said bill boxes.

24. An apparatus as set forth in claim 22, further comprising means for rejecting delivery of the bills stored in said bill pool and for storing the rejected bills in a space formed within one of said bill boxes.

25. An apparatus as set forth in claim 24, further comprising means, located in the path of said bill conveyor, for detecting an abnormal conveyance state of bills fed from said bill boxes, wherein said rejecting means is actuated in response to the detection the abnormal conveyance state by said detecting means.

* * * * *

UNITED STATES PATENT AND TRADEMARK OFFICE
CERTIFICATE OF CORRECTION

PATENT NO. : 4,607,155

DATED : AUGUST 19, 1986

INVENTOR(S) : MANABU NAO ET AL.

It is certified that error appears in the above-identified patent and that said Letters Patent is hereby corrected as shown below:

Col. 2, line 7, after "thereof;" insert --and--.

Col. 5, line 67, change "unit," to --unit)--.

Col. 6, line 10, "5'9" should be --S'9--.

Col. 11, line 18, after "user" insert --;--.

Col. 12, line 58, after "detection" insert --of--.

Signed and Sealed this

Fourth Day of November, 1986

[SEAL]

*Attest:*

DONALD J. QUIGG

*Attesting Officer* *Commissioner of Patents and Trademarks*